(12) United States Patent
Hernoux et al.

(10) Patent No.: US 6,581,475 B1
(45) Date of Patent: Jun. 24, 2003

(54) FLUID METER WITH IMPROVED COMPACTNESS

(75) Inventors: Luc Hernoux, Seneca, SC (US); Jean-Luc Guizot, Charenton le Pont (FR)

(73) Assignee: Schlumberger Industries, SA (FR)

( * ) Notice: Subject to any disclaimer, the term of this patent is extended or adjusted under 35 U.S.C. 154(b) by 0 days.

(21) Appl. No.: 09/530,523
(22) PCT Filed: Oct. 30, 1998
(86) PCT No.: PCT/FR98/02332
§ 371 (c)(1), (2), (4) Date: Aug. 30, 2000
(87) PCT Pub. No.: WO99/23458
PCT Pub. Date: May 14, 1999

(30) Foreign Application Priority Data

Nov. 4, 1997 (FR) .............................. 97 13934

(51) Int. Cl.$^7$ .............................. G01F 1/20; G01F 5/00
(52) U.S. Cl. ....................... 73/861.19; 73/202
(58) Field of Search ................. 73/861.19, 861.18, 73/861.21, 6; 137/6

(56) References Cited

U.S. PATENT DOCUMENTS

| 4,140,012 | A | * | 2/1979  | Hendriks ............... 73/273 |
| 4,750,370 | A | * | 6/1988  | Ossyra ................ 73/861.61 |
| 4,911,007 | A | * | 3/1990  | Churchill et al. ........ 73/202 |
| 4,976,155 | A | * | 12/1990 | Challandes ............. 137/826 |
| 5,864,067 | A | * | 1/1999  | Ligneul et al. .......... 73/861.21 |
| 6,131,470 | A | * | 10/2000 | Guizot et al. .......... 73/861.19 |

* cited by examiner

Primary Examiner—Herzon Williams
Assistant Examiner—Lilybett Martir
(74) Attorney, Agent, or Firm—Straub & Pokotylo; Michael P. Straub (57) ABSTRACT

The invention relates to a fluid meter comprising an outside wall of determined thickness to which a flange connected to a pipe is fixed via fixing members which penetrate into holes organized respectively in the thickness of said flange and in said outside wall in order to install said meter on said pipe, said meter having an opening for fluid feed which is organized in the outside wall and behind which there is provided a "feed" chamber into which the fluid coming from the feed opening flows, wherein the fluid meter also has studs disposed inside the feed chamber so as to modify the fluid flow, and in which internal perforations are provided in alignment with the holes for receiving portions of said fixing members.

19 Claims, 7 Drawing Sheets

FLUID METER WITH IMPROVED COMPACTNESS

The invention relates to a fluid meter comprising an outside wall of determined thickness to which a flange connected to a pipe is fixed via fixing members which penetrate into holes organized respectively in the thickness of said flange and in said outside wall in order to install said meter on said pipe, said meter having an opening for fluid feed which is organized in the outside wall and behind which there is provided a "feed" chamber into which the fluid coming from the feed opening flows.

BACKGROUND OF THE INVENTION

In such fluid meters, the flow coming from the feed opening and passing through the feed chamber can convey disturbances such as turbulent structures which are transported into the measurement unit.

The measurement unit which is constituted, for example, by a fluidic oscillator or which is of the ultrasound type, or indeed of the type using an obstacle with vortexes becoming detached in alternation at a frequency proportional to the flow rate, is sensitive to disturbing turbulent structures conveyed by the flow and which can give rise to errors of measurement.

OBJECTS AND SUMMARY OF THE INVENTION

An object of the present invention is to remedy that problem by proposing a fluid meter comprising an outside wall of determined thickness to which a flange connected to a pipe is fixed via fixing members which penetrate into holes organized respectively in the thickness of said flange and in said outside wall in order to install said meter on said pipe, said meter having an opening for fluid feed which is organized in the outside wall and behind which there is provided a "feed" chamber into which the fluid coming from the feed opening flows, wherein the fluid meter also has studs disposed inside the feed chamber so as to modify the fluid flow, and in which internal perforations are provided in alignment with the holes for receiving portions of said fixing members.

The turbulent structures present in the flow traveling through the feed chamber then encounter the studs and are destroyed, thus preventing such structures from propagating into the measurement unit of the meter.

The invention also makes it possible to reduce the size of the meter by considerably reducing the thickness of the outside wall of the meter in which the fixing members are inserted since these members now extend inside the studs placed in the feed chamber instead of being received solely in a thicker outside wall of the meter.

In the invention, the fluid meter may also comprise a second outside wall opposite to the first, of determined thickness, and on which another flange connected to another pipe is fixed via fixing members which penetrate into holes formed respectively in the thickness of said flange and in the outside wall in order to install said meter on said pipe, said meter also having an opening for exhausting fluid from the meter, which opening is provided in the second outside wall behind which a "exhaust" chamber is provided into which the fluid flows before escaping via said exhaust opening, the fluid meter further comprising studs disposed inside the exhaust chamber in such a manner as to modify the fluid flow, and in which internal perforations are provided in alignment with the holes for receiving portions of said fixing members.

Thus, the size of the meter can be further reduced between the flanges by considerably reducing the thickness of the other outside wall of the meter in which the fixing members are inserted since these members extend inside the studs disposed in the exhaust chamber.

According to a characteristic, the fluid meter comprises an inside wall placed facing one of the outside walls and serving to direct the fluid flow in at least one direction that is substantially parallel to said wall.

This wall can be disposed substantially perpendicularly to the flow direction of the fluid coming from the feed opening.

The studs are disposed substantially perpendicularly to the inside wall.

According to other characteristics:

at least some of the studs of the feed chamber or of the exhaust chamber are streamlined in a direction parallel to the inside wall and corresponding to the flow direction of the fluid circulating in said chamber;

the height of the studs lies in the range $0.5d$ to $d$, where $d$ corresponds to the spacing between the inside and outside walls defining the height of the feed chamber or the exhaust chamber;

the studs are distributed on a common circumference;

the feed opening or the exhaust opening is disposed inside said circumference;

at least one orifice is provided in the feed chamber for allowing the fluid flow to leave said feed chamber;

in a view in a plane parallel to the inside wall, at least some of the studs are streamlined towards the outlet orifice(s) of the feed chamber;

in a view in a plane parallel to the inside wall, at least some of the studs present portions of pointed shape directed towards the outlet orifice(s) of the feed chamber; and in a view on a plane parallel to the inside wall, the orifice(s) is/are disposed outside the circumference.

In a view in a plane parallel to the inside wall, at least some of the studs present portions in the form of points directed towards the exhaust opening from the exhaust chamber, each of said streamlined studs being oriented on an axis passing through the center of said stud and through its point, the axes of said studs converging on a point which is offset from the center of the exhaust opening and which is situated between said studs and said center of the exhaust opening.

Advantageously, to reduce in very significant manner the size of the fluid meter of the invention which comprises a measurement unit, the unit is a measurement unit disposed substantially perpendicularly to the direction in which the fluid feed and exhaust openings are aligned.

The fluid meter may comprise a measurement unit constituted by a fluidic oscillator or which is of the ultrasound type.

BRIEF DESCRIPTION OF THE DRAWINGS

Other characteristics and advantages appear from the following description given purely by way of example and made with reference to the accompanying drawings, in which.

MORE DETAILED DESCRIPTION

Figure 1:
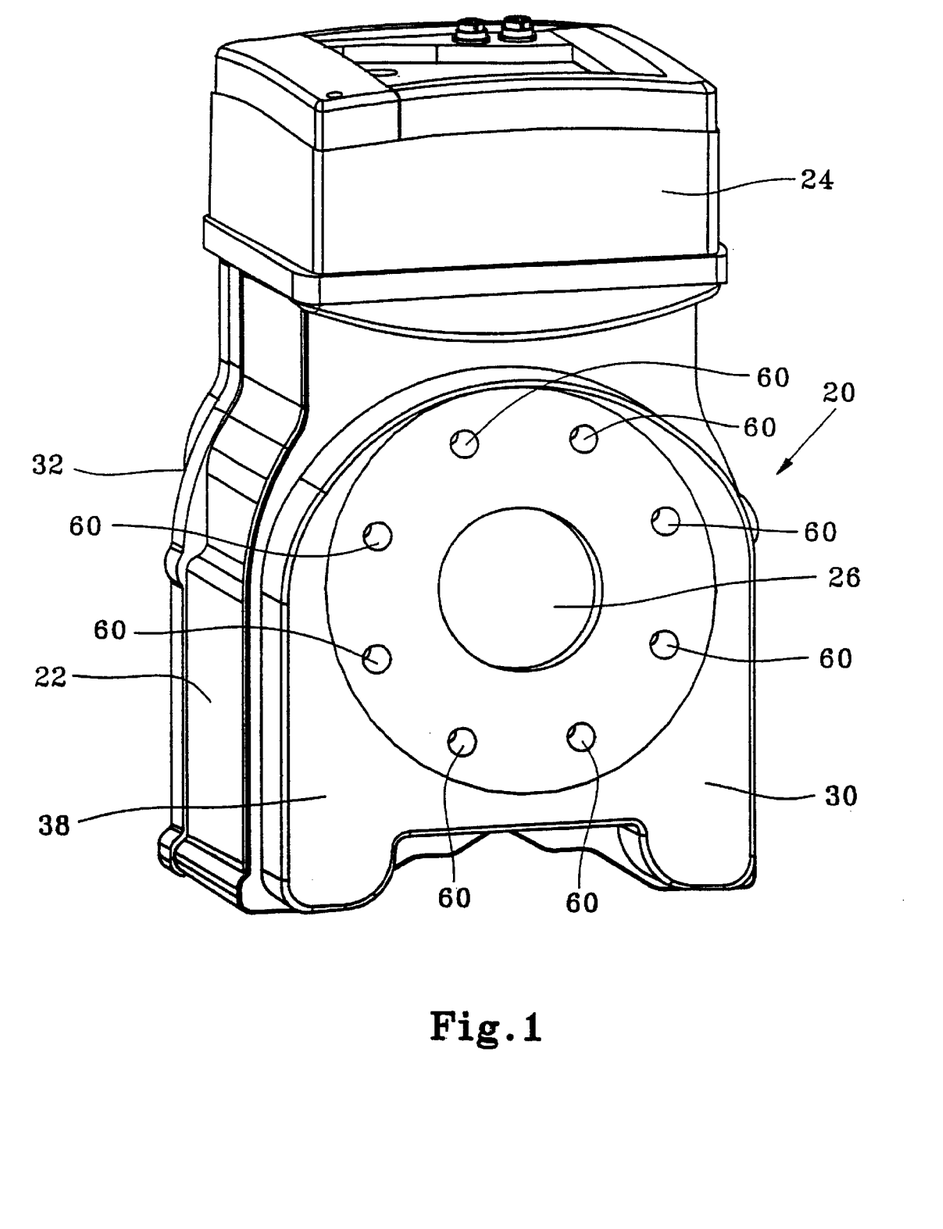
FIG. 1 is a perspective view of a fluid meter of the invention.

As shown in FIG. 1, and given overall reference 20, a gas meter of the invention comprises a body 22 having a counter 24 mounted thereon.

Figure 2:
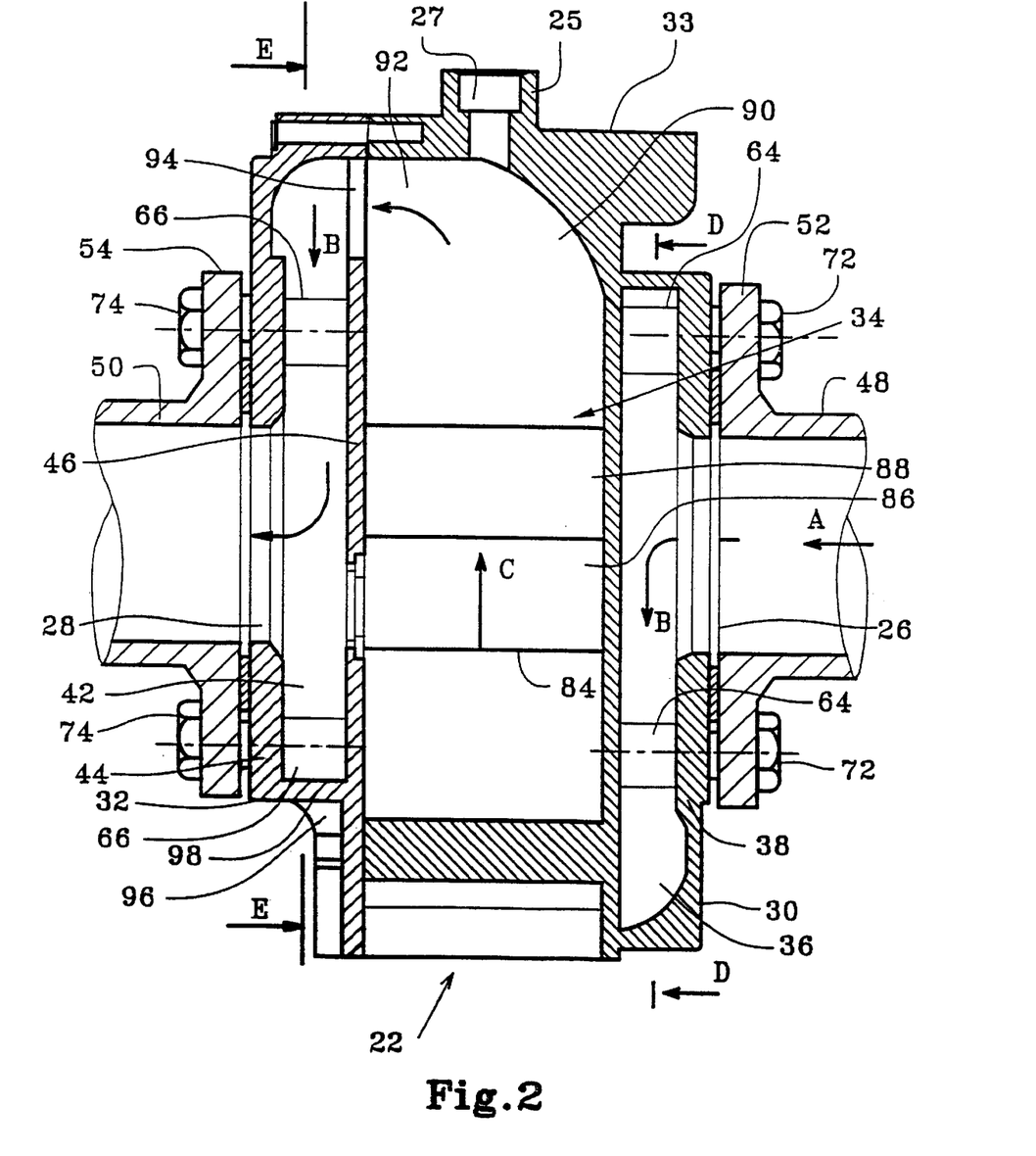
FIG. 2 is a simplified diagrammatic cross-section view of the meter of FIG. 1.
Figure 3:
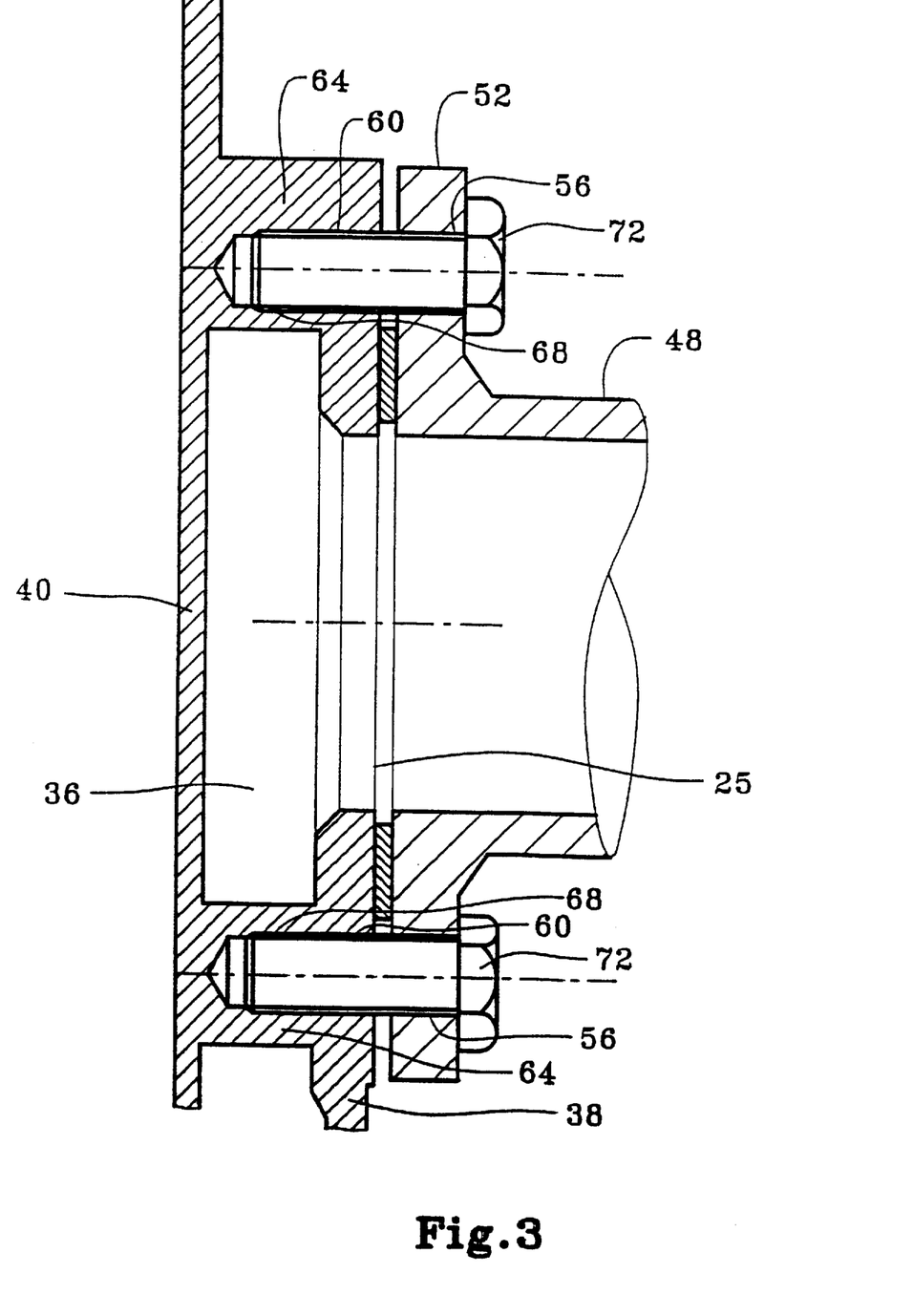
FIG. 3 is a view on a larger scale of the side portion 30 of the FIG. 2 meter on a section plane containing two studs.
Figures 5, 7:
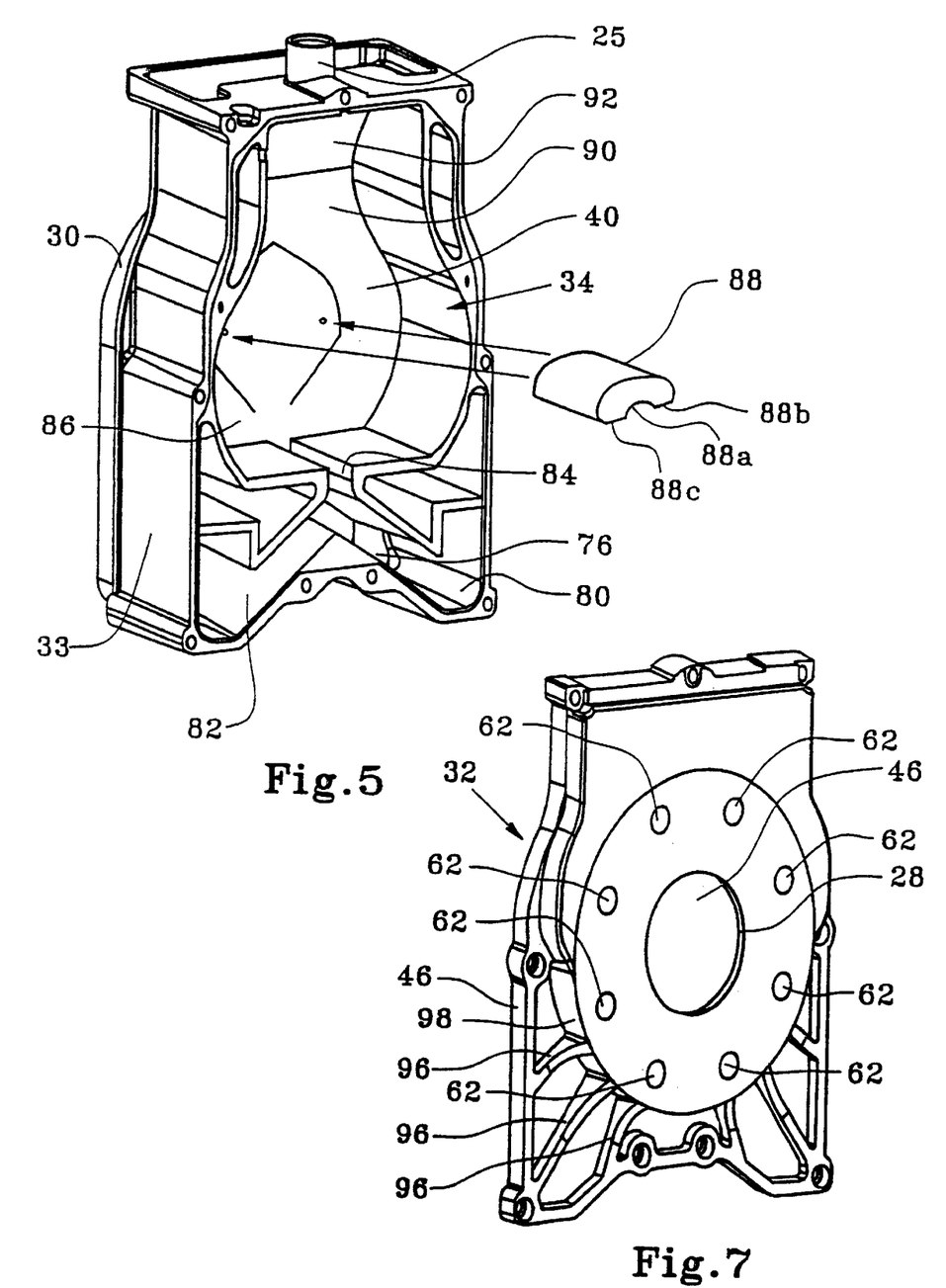
FIG. 5 is a perspective view of the inside of the measurement unit of the FIG. 1 meter.
FIG. 7 is a perspective view of the end portion 32 of the fluid meter of the invention and which is fitted to the measurement unit shown in FIG. 5.

In FIGS. 2, 3, and 5, a duct 25 pierced by a hole 27 is fitted to the top portion of the body 22 so as to allow electrical connections to be made between said body and the counter 24.

The body has an opening 26 for feeding fluid into the meter in a first direction identified by the arrow marked A and which is referred to below as "direction A".

FIG. 2 also shows another opening 28 for exhausting fluid from the meter and which is in alignment with the feed opening 26 in said direction A.

The body of the meter has two end portions 30 and 32 on either side of a central block 33 including a measurement unit 34, as shown in FIG. 2.

On the inside, the end portion 30 defines a "feed" chamber 36 shown in FIGS. 2 and 3.

This chamber is defined by an outside wall 38 into which the opening 26 is engaged and by another wall 40 facing it on the inside.

On the inside, the end portion 32 defines an "exhaust" chamber 42 shown in FIGS. 2 and 7.

This chamber is defined by an outside wall 44 at the opposite end from the outside wall 38 and in which there is provided an exhaust opening 28, and by another wall 46 placed facing it on the inside.

The meter 20 is installed between two pipes 48 and 50 each of which is fitted with a respective flange 52 or 54 having a respective plurality of holes (e.g. eight holes) 56 formed therethrough around a common circumference.

Each outside wall 38, 44 of the meter is placed in contact with a respective flange 52, 54 and likewise has eight holes 60 (FIG. 1) placed on the same circumference and in the thickness of said wall, in alignment with the holes 56 of the flanges (FIGS. 2 and 3).

A plurality (eight) studs 64, 66 which can be seen in FIGS. 2, 3, 4, and 7, are disposed respectively in the feed chamber 36 and in the exhaust chamber 42 substantially perpendicular to the inside and outside walls 40, 46 and 38, 44.

These studs are disposed in alignment with the holes 56, 60 in the flanges 52, 54 associated with the outside walls 38, 44, and they have internal perforations 68, 70 in alignment with said holes 56, 60, as can be seen in FIG. 3.

When it is desired to secure the meter 20 to the pipes 48, 50, fixing members such as screws 72, 74 are engaged in the holes 56, 60 and in the internal perforations 68, 70 which perforations receive respective end portions of the fixing screws, as can be seen in FIG. 3.

Consequently, this advantageous disposition makes it possible to have outside walls 38, 44 that are much thinner than in a configuration where the fixing screws do not penetrate into the feed and exhaust chambers, thereby making it possible for the size of the meter between the feed and exhaust openings 26, 28 to be reduced.

By way of example, the thicknesses of the outside walls are reduced from 38.6 mm to 12.6 mm.

It should be observed that it is possible to make do with reducing the thickness of the outside wall 38 in this manner while leaving an outside wall 44 of normal thickness, or vice versa, when space constraints make that possible.

Furthermore, because no resistance is offered to the flow at the outlet from the meter, it is possible to avoid increasing head losses through the meter.

Figure 4:
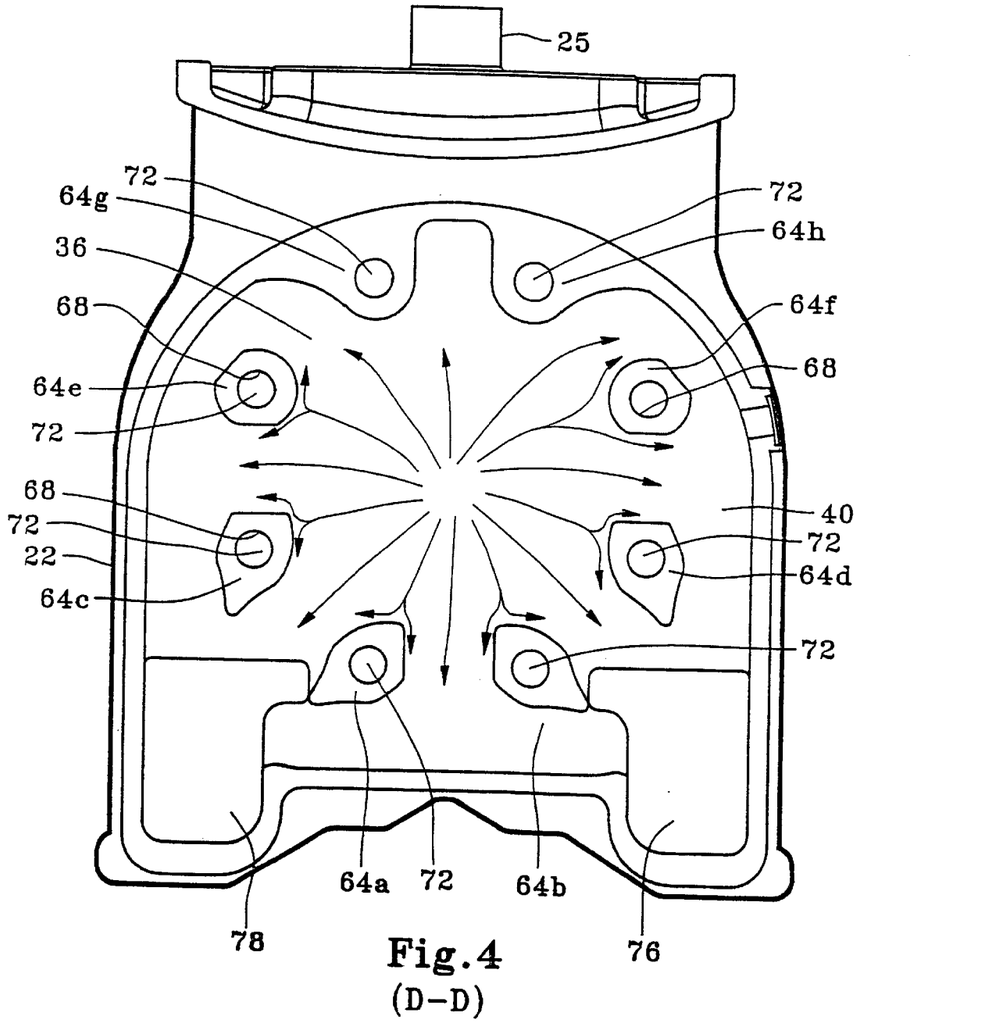
FIG. 4 is a fragmentary diagrammatic view of the FIG. 2 meter on D—D.

The flow of fluid coming from the feed opening 26 strikes the inside wall 40 (FIGS. 2 and 4) and is split up inside the feed chamber 36 into a plurality of directions that extend substantially parallel to said wall, as represented by arrows in FIG. 4.

A portion of this split flow meets the outside surfaces of the studs 64 which extend perpendicularly to the direction of said flow and is split up further so as to pass round said studs, to flow between the studs through the passages that are left empty for the flow.

Another portion of the flow as split up in this way travels directly through the passages between the studs 64.

Because of the presence of the studs and the passages of small section for the flow between said studs, the disturbances (turbulent structures, flow asymmetries, . . . ) present in the flow on entering the feed chamber are destroyed.

These studs 64a–64h thus enable the split flow to be channeled towards two outlet orifices 76 and 78 from the feed chamber 36 which are provided through the wall 60. To improve the guidance of the split flow, the studs are streamlined in a direction parallel to the inside wall 40 going towards the outlet orifices 76 and 78.

The studs 64a–64d which are closest to the orifices 76 and 78 have downstream portions of pointed shape directed towards the middle of the closer orifice, whereas the studs 64e and 64f which are further away do not have this shape.

However, the studs 64e and 64f can be streamlined so as to further improve flow guidance.

In contrast, in a configuration having only four studs (not shown) it is necessary for all of the studs to be streamlined.

There is no need to allow the flow to go past the studs 64g and 64h since very little flow is present in this portion of the feed chamber.

The flow sections between pairs of consecutive studs 64a–64b, 64c–64e, 64d–64f are preferably rectilinear so as to provide a flow section that is as large as possible.

However the flow sections between pairs of studs 64a–64c and 64b–64d are streamlined so as to accelerate flow since these passages situated between respective pairs of studs point directly towards a corresponding orifice 76 or 78.

As shown in FIG. 5, two passages 80, 82 extend the orifices 76, 78 respectively and direct fluid flow fractions so that they converge on the inlet 84 of the measurement unit 34. This inlet is generally in the form of a slot that is elongate in the direction A.

In a variant, these two passages 80, 82 could be replaced by a single passage extending a single orifice (instead of two orifices 76, 78) which would then be disposed, for example, between the two orifices shown 76 and 78.

The fluid at the inlet 84 of the measurement unit flows in a direction opposite to that of the fluid in the chamber 36

(arrow B) in a second direction identified by the arrow marked C in FIG. 2 and which is perpendicular to the first direction A.

The measurement unit 34 has an oscillation chamber 86 (FIGS. 2 and 5) in which an obstacle 88 is positioned as shown by the two arrows in FIG. 5 so that it faces the inlet 84.

The general shape of the obstacle is elongate in the direction A.

In its front portion facing the slot 84, the obstacle has a central cavity 88a and two side faces 88b and 88c on either side thereof and contained in a common plane perpendicular to the direction C.

The fluid penetrating into the oscillation chamber and striking the front portion of the obstacle 88 oscillates transversely relative to the direction C in a plane parallel to the wall 40 and flows alternately round one side or the other of said obstacle so as to leave the oscillation chamber via the outlet 90 in said direction C.

The inlet 84 and the outlet 90 of the oscillation chamber are in alignment on the direction C which is perpendicular to the direction A in which the fluid is fed and exhausted, so the size of the meter between the feed opening 26 and the exhaust opening 28 is thus greatly reduced.

The meter can thus be placed level with its feed and exhaust openings 26 and 28 between two flanges that are closer together than in the prior art.

The measurement unit 34 is thus generally elongate in shape in the direction C and can take up various different orientations in the plane perpendicular to the direction A.

Figure 6:
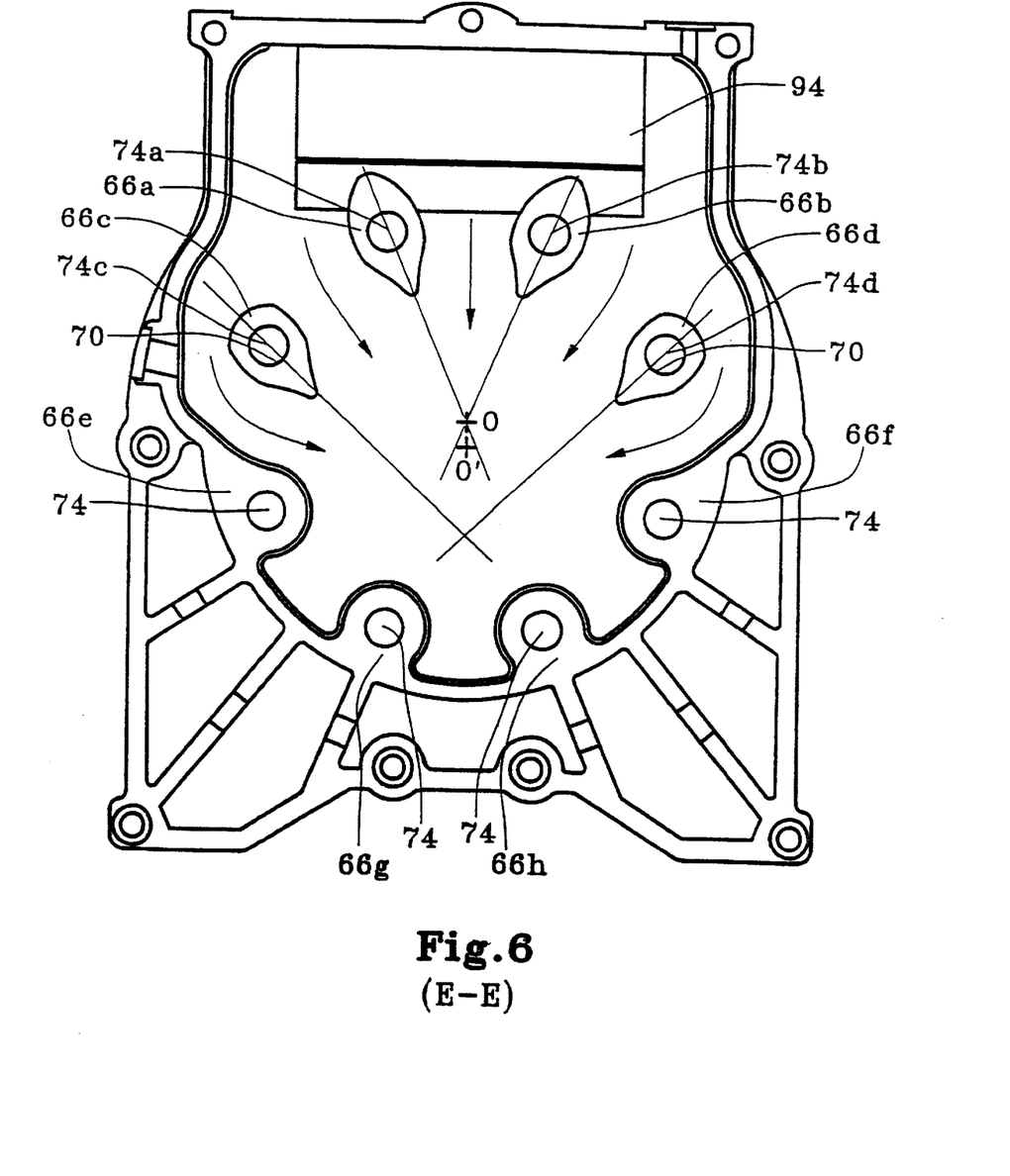
FIG. 6 is a section view of the FIG. 2 meter on E—E.

The oscillation chamber 86 is defined firstly by the wall 40 and secondly by the wall 46 which is parallel to said wall 40 (FIGS. 2, 5, and 6).

The fluid which leaves the oscillation chamber takes the passage 92 which forms a bend so as to impart the direction B to said fluid.

The passage 92 extends across the wall 46 in which an orifice 94 is provided (FIG. 2).

In a variant, this passage could be replaced by two or more passages.

After passing through the orifice 94, the fluid penetrates into the exhaust chamber 42 where the "guide" wall 46 serves to guide said fluid to its outlet via the exhaust opening 28.

As shown in FIG. 6, which is a view in a plane parallel to the outside wall 44, a plurality of studs 66a–66d that are located relatively close to the orifice 94 are streamlined towards the exhaust opening 28, each of these studs having a pointed portion directed towards said opening.

The two studs 66a and 66b situated closest to the orifice 94 are oriented in directions defined by axes shown in fine lines, passing through the centers of the corresponding studs and through their points, and the axes of these studs converge on a point 0 which is offset from the center 0' of the exhaust opening (in projection in the plane of FIG. 6) and which is situated between said studs and said center of the exhaust opening.

This arrangement makes it possible to prevent the flow going via the exhaust opening 28 striking the wall of the pipe 50 situated at the bottom in FIG. 2.

The other studs 66e and 66h do not have the same profile since in this configuration they are located in a zone where the fluid flows at low speed. Nevertheless, in a configuration that has only four studs (not shown), it is necessary for all of the studs to be streamlined.

As shown in FIGS. 2 to 6, the end portion 30 is made as a single piece with the central block 33 of the body 22 which includes the measurement unit 34, while the other end portion 32 is made separately and is subsequently fitted to the central block so as to act as a cover.

While the gas meter is in operation, it conveys fluid at a pressure of several bars so, in order to avoid deforming the end portion 32, reinforcing ribs 96 are provided therein (FIGS. 2 and 7). These ribs extend over the outside face of the wall 46 between the peripheral wall 98 interconnecting the two walls 44 and 46 perpendicularly, and the periphery of said wall 46.

The separate end wall 32 can also be constituted by a plurality of elements instead of being made as a single element, with one of these elements, the wall 46, being fitted to the central block, and the others being fitted to said wall 46.

Nevertheless, that solution is less effective from the point of view of leakproofing.

Figure 8:
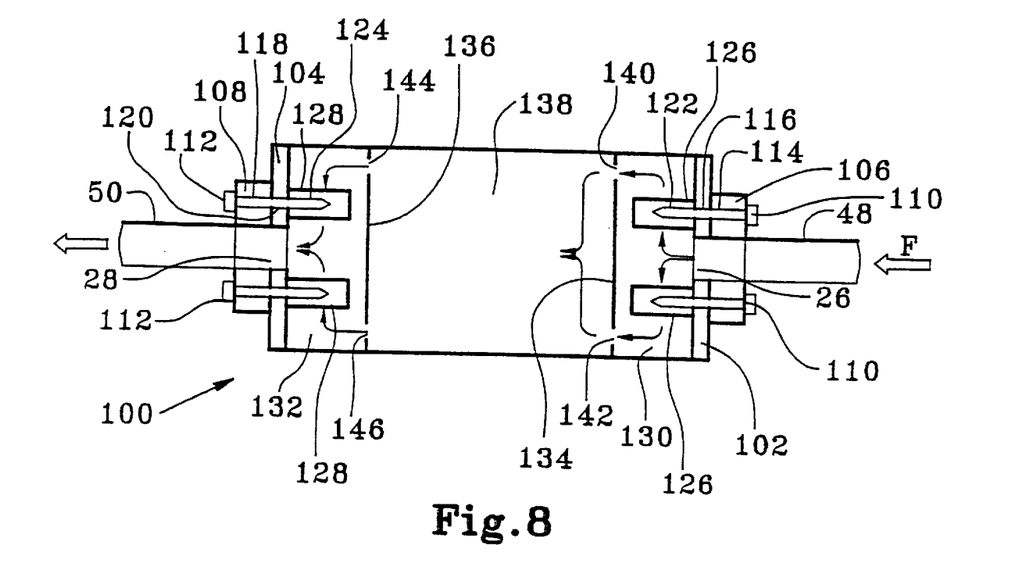
FIG. 8 is a view of a variant embodiment of the invention.

As a variant, FIG. 8 shows a view of a fluid meter 100 of the invention which is connected to the pipes 48 and 50 via two opposite outside walls 102 and 104 that are in contact with respective flanges 106 and 108 secured to said pipes.

Fixing screws 110, 112 penetrate in respective holes 114, 116 and 118, 120 formed in the thickness of each flange associated with each outside wall and through internal perforations 122, 124 provided in the studs 126, 128 placed inside the meter, in a manner that is analogous to that described with reference to FIGS. 2 and 3.

Internal chamber 130 and 132 respectively for feeding and exhausting the fluid are provided between each outside wall 102, 104 and a facing inside wall 134, 136.

In this variant, the fluid meter 100 has a measurement unit disposed in the space 138 between the two chambers and which is elongate in the longitudinal direction of flow in the pipes 48, 50 as identified by the arrow referenced F, instead of being disposed perpendicularly thereto as shown in FIGS. 2 and 5.

Unlike that which is described with reference to those figures, the studs 126, 128 are disposed inside these chambers over a length that is less than the spacing d between the inside and outside walls 134, 102 or 136, 104 which define said chambers in part. The height of these studs is thus equal to $0.8d$, for example.

It is important for the height of the studs to be at least $0.5d$ for studs which are situated in a zone where the flow speed is high.

This makes it possible to ensure that the flow circulating inside the chambers 130, 132 parallel to the inside and outside walls is sufficiently influenced by meeting said studs to destroy any disturbances conveyed by said flow.

In the configuration shown in FIG. 8, the flow coming from the feed opening 26, and which is split up on the inside wall 134, is distributed inside the feed chamber 130 perpendicularly to the studs 126 and reaches the two outlet orifices 140, 142 of the chamber situated at the top and the bottom thereof, and the flow fractions subsequently reunite downstream from said orifices so as to pass through the measurement unit which can be constituted, for example, by a fluidic oscillator as shown in FIGS. 2 and 5, or by a measurement duct and ultrasound transducers which define between them at least part of a measurement path in the fluid.

To clarify the description of this variant of the invention, the measurement unit is not shown in FIG. 8.

The flow coming from the measurement unit enters into the exhaust chamber 132 via two inlet orifices 144, 146 situated at the top and at the bottom thereof, it flows inside said chamber perpendicularly to the studs 128 organized in identical manner to those of the feed chamber, and it then takes the exhaust opening 28 to leave the meter.

Although not described in detail, the studs disposed in the flow are streamlined to comply with the flow directions inside the chambers in a manner similar to that described above with reference to FIGS. 4 and 6.

What is claimed is:

1. A fluid meter, comprising:
   a first outside wall of determined thickness including a fluid feed opening and a first plurality of holes extending through said first outside wall, said holes being for receiving fixing members used to fix a flange connected to a pipe to said outside wall, said first outside wall defining a first side of a fluid feed chamber, said holes and said fluid feed opening extending through said first outside wall into the feed chamber; and
   a plurality of studs, said first outside wall serving as a first wall of said feed chamber, said studs being positioned inside the feed chamber to modify fluid flow by contacting fluid as fluid flows from said fluid feed opening through the feed chamber, each of said studs being aligned with one of said holes and including an internal perforation for receiving at least a portion of one of said fixing members.

2. The fluid meter according to claim 1, further comprising:
   a second outside wall of determined thickness including a fluid exhaust opening and a second plurality of holes extending through said second outside wall, said holes being for receiving second fixing members used to fix a second flange connected to a second pipe to said second outside wall, said second outside wall being positioned parallel to said first outside wall and defining a first side of a fluid exhaust chamber, said second plurality of holes and said fluid exhaust opening extending through said second outside wall into said exhaust chamber; and
   a second plurality of studs, said second plurality of studs being positioned inside the exhaust chamber to modify fluid flow by contacting fluid as fluid flows through said exhaust chamber, each of said second studs being aligned with one of said second plurality of holes and including an internal perforation for receiving at least a portion of one of said second fixing members.

3. A fluid meter according to claim 1, further comprising an inside wall, the inside wall defining a second side of said fluid feed chamber and serving to direct fluid flowing through said fluid feed chamber in at least one direction that is substantially parallel to said inside wall.

4. A fluid meter according to claim 3, in which the inside wall is disposed substantially perpendicularly to the flow direction of fluid entering the meter assembly through the fluid feed opening.

5. A fluid meter according to claim 3, in which the first plurality of studs extend through said first outside wall in a direction substantially perpendicular to the inside wall.

6. A fluid meter according to claim 3, in which at least some of the first plurality of studs are streamlined in a direction parallel to the inside wall and corresponding to the flow direction of fluid circulating in said chamber.

7. A fluid meter according to claim 3, in which the height of the studs lies in the range 0.5$d$ to $d$, where $d$ corresponds to the spacing between the inside wall and first outside wall defining the feed chamber.

8. A fluid meter according to claim 1, in which the studs in said first plurality of studs are distributed on a common circumference.

9. A fluid meter according to claim 8, in which the fluid feed opening or the exhaust opening is disposed inside said circumference.

10. A fluid meter according to claim 3, in which at least some of the first plurality of studs of the fluid feed chamber are streamlined in a direction parallel to the inside wall and corresponding to the flow direction of the fluid circulating in said chamber, and in which, in a view in a plane parallel to the inside wall, at least some of the studs present portions in the form of points directed towards an outlet orifice.

11. A fluid meter according to claim 1, in which at least one outlet orifice is provided in the fluid feed chamber for allowing the fluid flow to leave said feed chamber.

12. A fluid meter according to claim 11, in which, in a view in a plane parallel to the inside wall, at least some of the first plurality of studs are streamlined towards the outlet orifice of the fluid feed chamber.

13. A fluid meter according to claim 12, in which, in a view in a plane parallel to the inside wall, at least some of the first plurality of studs include portions having a pointed shape that is directed towards the outlet orifice of the fluid feed chamber.

14. A fluid meter according to claim 11,
   which the studs in said first plurality of studs are distributed on a common circumference, and
   in which, in a view on a plane parallel to the inside wall, the outlet orifice is disposed outside the common circumference.

15. A fluid meter according to claim 1, comprising a measurement unit disposed substantially perpendicularly to the direction in which the fluid feed and exhaust openings are aligned.

16. A fluid meter according to claim 1, having a measurement unit constituted by a fluidic oscillator.

17. A housing assembly for use as part of a fluid meter including a measurement unit, the housing assembly comprising:
   an outside wall including an inlet orifice through which fluid can flow, the outside wall extending in a direction perpendicular to an inlet fluid flow direction;
   a plurality of studs extending through said outside wall in a direction parallel to said inlet fluid flow direction, said studs for receiving fixing members used to attach a pipe flange to said outside wall, said pipe flange extending radially outward in a direction perpendicular to said inlet fluid flow direction; and
   an inside wall extending in a direction substantially perpendicular to said inlet fluid flow direction mounted opposite said outside wall, the space between said outside wall and said inside wall defining a feed chamber into which at least a portion of said studs extend, said inside wall directing at least some fluid, entering said feed chamber through said inlet orifice, in a direction substantially perpendicular to said inlet fluid flow direction and around at least a portion of said studs towards an outlet orifice which provides a path through which fluid can flow from said feed chamber into said measurement unit.

18. The housing assembly of claim 17, wherein at least some of said studs include a surface which is exposed to said fluid flow as it travels around at least a portion of said studs in the direction perpendicular to said inlet fluid flow direction, at least a portion of said exposed surface of said at least some studs having a non-circular shape which points in the direction of said outlet orifice.

19. The housing assembly of claim 18, wherein said studs are located a uniform distance from the center of said inlet orifice along a circumference.

* * * * *